(12) United States Patent
Takakusaki

(10) Patent No.: US 11,067,228 B2
(45) Date of Patent: Jul. 20, 2021

(54) PLANAR ILLUMINATION DEVICE

(71) Applicant: MINEBEA MITSUMI Inc., Nagano (JP)

(72) Inventor: Kenta Takakusaki, Shizuoka (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 16/761,079

(22) PCT Filed: Oct. 4, 2018

(86) PCT No.: PCT/JP2018/037194
§ 371 (c)(1),
(2) Date: May 1, 2020

(87) PCT Pub. No.: WO2019/097883
PCT Pub. Date: May 23, 2019

(65) Prior Publication Data
US 2020/0378566 A1 Dec. 3, 2020

(30) Foreign Application Priority Data

Nov. 17, 2017 (JP) .............................. JP2017-222206

(51) Int. Cl.
G09F 13/18 (2006.01)
F21K 9/61 (2016.01)
F21V 8/00 (2006.01)
(52) U.S. Cl.
CPC ............... *F21K 9/61* (2016.08); *G02B 6/009* (2013.01); *G02B 6/0061* (2013.01); *G02B 6/0068* (2013.01)

(58) Field of Classification Search
CPC ............................ G02B 6/0016; G02B 6/0018
See application file for complete search history.

(56) References Cited

U.S. PATENT DOCUMENTS 5,852,483 A 12/1998 Newstead et al.
8,449,163 B2* 5/2013 Yang .................... G02B 6/0091
362/607

(Continued)

FOREIGN PATENT DOCUMENTS

JP 08-234204 A 9/1996
JP 2008-130336 A 6/2008

(Continued)

OTHER PUBLICATIONS

International Search Report for corresponding International Application No. PCT/JP2018/037194 dated Dec. 25, 2018.

(Continued)

*Primary Examiner* — Andrew J Coughlin
(74) *Attorney, Agent, or Firm* — Pearne & Gordon LLP

(57) ABSTRACT

A planar illumination device according to an embodiment includes a light guide plate, an attenuation element, and a plurality of light sources. The light guide plate has a light-emitting surface that is a main surface through which light is emitted and a light-receiving side surface that is a side surface intersecting with the light-emitting surface and receives the light. The attenuation element attenuates the light entering through the light-receiving side surface. The light sources face the light-receiving side surface of the light guide plate and are arranged in parallel with one another at certain intervals. One of the intervals closer to the attenuation element is smaller than another of the intervals distanced from the attenuation element.

15 Claims, 8 Drawing Sheets

(56) References Cited

U.S. PATENT DOCUMENTS

| | | | |
|---|---|---|---|
| 2006/0220046 A1* | 10/2006 | Yu | G02B 6/003 257/98 |
| 2007/0216992 A1* | 9/2007 | Tzeng | G02B 6/0068 359/333 |
| 2010/0182541 A1* | 7/2010 | Ouchi | G02B 6/008 349/65 |
| 2010/0253883 A1 | 10/2010 | Tomizuka | |
| 2011/0235365 A1 | 9/2011 | McCollum et al. | |
| 2012/0307523 A1 | 12/2012 | Oya | |
| 2013/0155720 A1* | 6/2013 | Kuromizu | G02B 6/0068 362/609 |
| 2015/0077643 A1 | 3/2015 | Yamakawa et al. | |
| 2016/0116667 A1* | 4/2016 | Shiraishi | G02B 6/0068 349/65 |

FOREIGN PATENT DOCUMENTS

| | | |
|---|---|---|
| JP | 2013-247065 A | 12/2013 |
| JP | 2014-120319 A | 6/2014 |
| WO | 2013/150938 A1 | 10/2013 |

OTHER PUBLICATIONS

Written Opinion for corresponding International Application No. PCT/JP2018/037194 dated Dec. 25, 2018.
Extended European Search Report dated Nov. 11, 2020 for corresponding European Application No. 18879020.8.
English translation of the Written Opinion for corresponding International Application No. PCT/JP2018/037194 dated Dec. 25, 2018.
Second Chinese Office Action dated Mar. 31, 2020 for corresponding International Application No. 201880003476.7 and English translation.

* cited by examiner

PLANAR ILLUMINATION DEVICE

FIELD

The present invention relates to a planar illumination device.

BACKGROUND

Sidelight-type planar illumination devices have conventionally been known in which a plurality of light sources such as light emitting diodes (LEDs) are arranged in parallel at equal intervals along a side surface of a light guide plate. Such a light guide plate used for a planar illumination device is manufactured, for example, by injection molding that injects a resin material into a mold and makes the material solid therein.

In such a light guide plate manufactured by injection molding, a projection corresponding to a resin injection gate of the mold may be left without being cut off (for example, see Patent Literature 1). Such a projection is used, for example, for the positioning of the light guide plate to the frame.

CITATION LIST

Patent Literature

Patent Literature 1: Japanese Patent Application Laid-open No. 2013-247065

SUMMARY

Technical Problem

However, a conventional technology such that a plurality of light sources are arranged in parallel at equal intervals along the light guide plate comprising the projection has an issue of attenuation of a part of light from light sources. The projection therefore causes a reduction in the luminance of light emitted from areas near the projection and accordingly causes variation in the luminance. Attenuation of light can be caused by various factors other than the projection.

To overcome the above issue, the present invention aims to provide a planar illumination device that causes less variation in the luminance.

Solution to Problem

It is an object of the present invention to at least partially solve the problems in the conventional technology. A planar illumination device according to an embodiment comprises a light guide plate, an attenuation element, and a plurality of light sources. The light guide plate comprises a light-emitting surface that is a main surface through which light is emitted, and a light-receiving side surface that is a side surface intersecting with the light-emitting surface and receives the light. The attenuation element is disposed on the light guide plate and attenuates the light entering to the light guide plate through the light-receiving side surface of the light guide plate. The plurality of light sources face the light-receiving side surface of the light guide plate and are arranged in parallel with one another at certain intervals, one of the intervals closer to the attenuation element being smaller than another of the intervals distanced from the attenuation element.

Advantageous Effects of Invention

According to an embodiment of the present invention, a planar illumination device is provided that prevents variation in the luminance.

DESCRIPTION OF EMBODIMENTS

Figure 1:
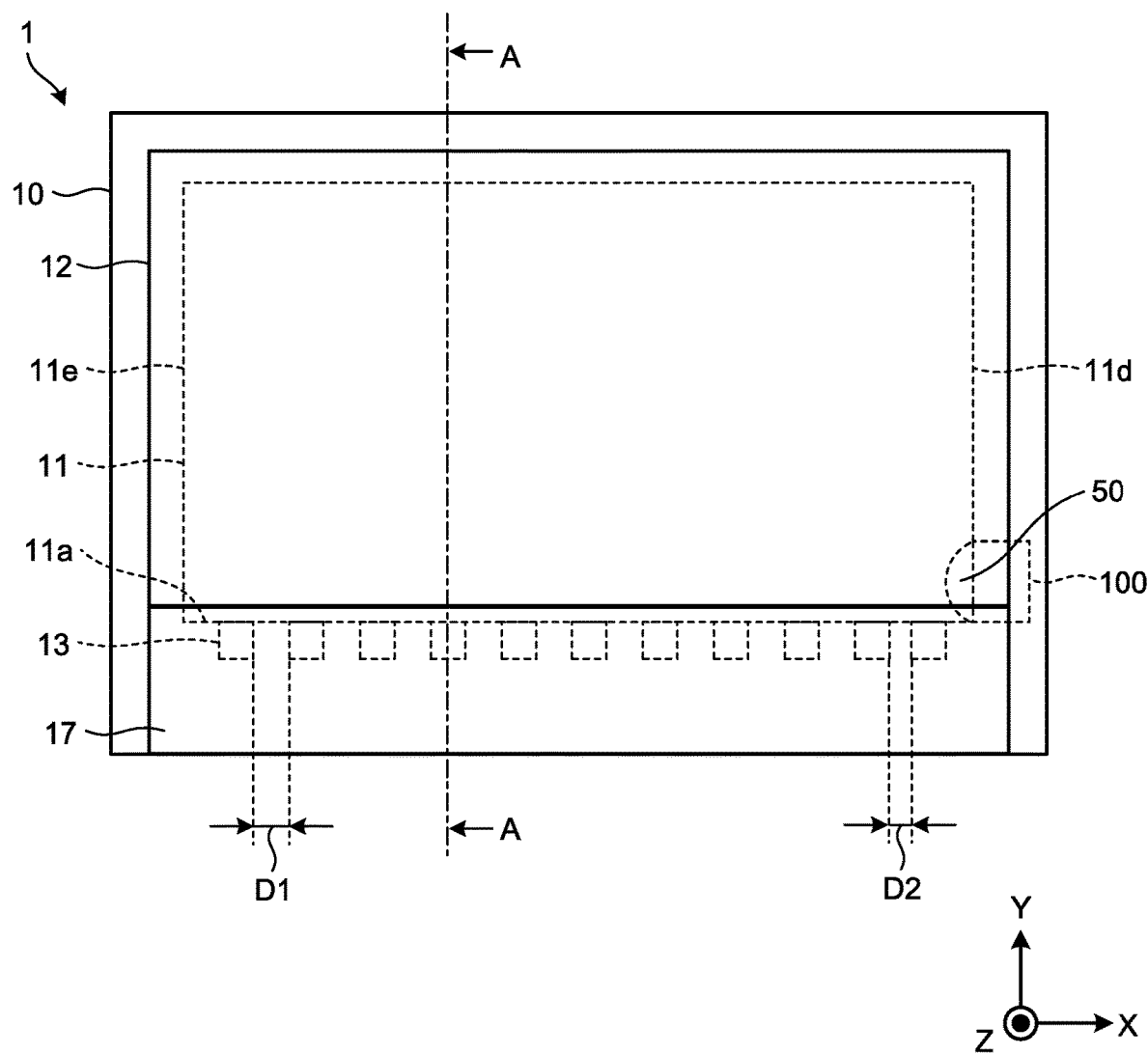
FIG. 1 is a top view of a planar illumination device according to an embodiment.

A planar illumination device of an embodiment will now be described with reference to the drawings. The scale of a component to another and the proportion of a component illustrated in the drawings may be different from the actual scale and proportion. The scale and proportion of a component may be different across the drawings.

Figure 2:
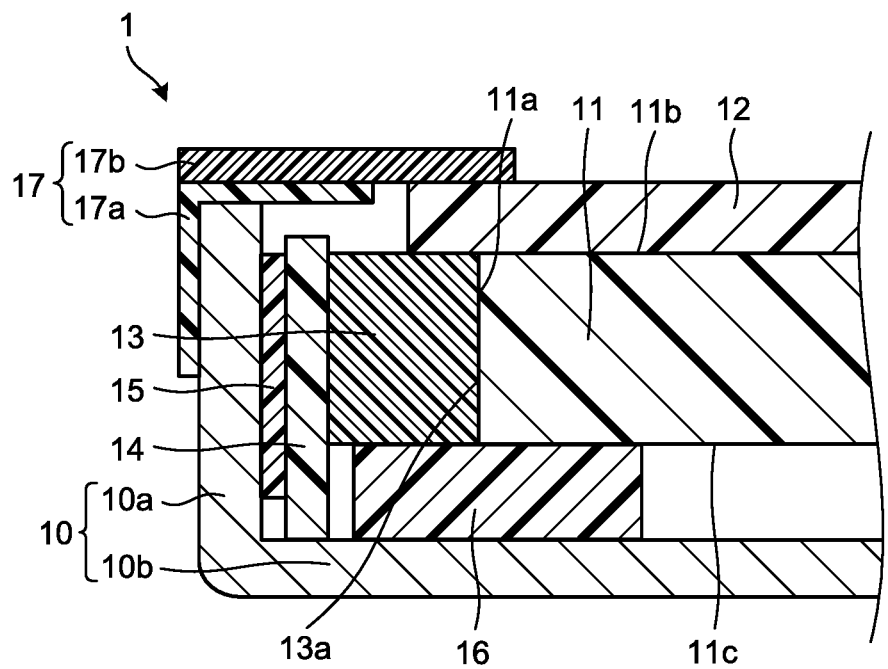
FIG. 2 is a sectional view of the planar illumination device according to the embodiment.

The planar illumination device of the embodiment will now be described with reference to FIG. 1 and FIG. 2. FIG. 1 is a top view of a planar illumination device 1 of the embodiment. FIG. 2 is a sectional view of the planar illumination device 1 of the embodiment. For easy understanding, FIG. 1 and other drawings illustrate orthogonal coordinate systems of a three-dimensional space with a direction in which light is emitted from the planar illumination device 1 defined as the Z-axis positive direction. FIG. 2 illustrates a sectional surface of the planar illumination device 1 along A-A line of FIG. 1.

The planar illumination device 1 of the embodiment is used as, for example, a backlight of a display. The display is used as, for example, an indicator mounted on a car.

As illustrated in FIG. 1 and FIG. 2, the planar illumination device 1 of the embodiment includes a frame 10, a light guide plate 11, an optical sheet 12, a plurality of light sources 13, a substrate 14, a fixing member 15, a connecting member 16, and a light-shielding unit 17.

The frame 10 is, for example, a frame member formed of metal or resin or other materials and accommodates therein the light guide plate 11, the optical sheet 12, the light sources 13, the substrate 14, the fixing member 15, and the connecting member 16.

As illustrated in FIG. 2, the frame 10 includes a side wall 10*a* and a bottom 10*b*. The later-described substrate 14 is fixed to the inner surface of the side wall 10*a*. The inner surface of the bottom 10b faces a later-described main surface 11c of the light guide plate 11.

The light guide plate 11 is a flat board member formed of a transparent material such as a polycarbonate resin. For example, the light guide plate 11 is manufactured by injection molding that injects a resin material into a mold and makes the material solid therein. The light guide plate 11 has a side surface 11a and two main surfaces 11b and 11c.

The side surface 11a is a surface (hereinafter, a light-receiving side surface 11a) that intersects with the two main surfaces 11b and 11c and receives light from the later-described light sources 13. The main surface 11b is a surface (hereinafter, a light-emitting surface 11b) through which the incident light is emitted. The main surface 11c is a surface (hereinafter, an opposite surface 11c) opposite to the light-emitting surface 11b. The light guide plate 11 may have a portion in the form of wedge that becomes thicker toward the light-receiving side surface 11a. The light guide plate 11 may have the opposite surface 11c provided with a reflection sheet that reflects light leaking from the light guide plate 11 and returns the reflected light to the light guide plate 11.

As illustrated in FIG. 1, on the light guide plate 11, for example, a gate portion 100 is formed. The gate portion 100 is a portion that projects from an intersecting side surface 11d, which is a side surface in the X-axis positive direction of two side surfaces 11d and 11e (hereinafter, intersecting side surfaces 11d and 11e) intersecting with the light-receiving side surface 11a and the light-emitting surface 11b.

The gate portion 100 corresponds to a gate through which a resin material is injected, of a mold used for injection molding to manufacture the light guide plate 11. The gate portion 100 fixes the position of the light guide plate 11 by, for example, being mated with a recess (not illustrated) of the frame 10. The gate portion 100 may be formed only on the opposite intersecting side surface 11e or may be formed on both the intersecting side surfaces 11d and 11e. The gate portion 100 may be formed on a side surface of the light guide plate 11 opposite to the light-receiving side surface 11a, which will be described later with reference to FIG. 4.

FIG. 1 further illustrates an affected region 50 the luminance of which is affected by the gate portion 100. The affected region 50 will be described later.

The optical sheet 12 (an example of a laminated member) is laminated on the light-emitting surface 11b of the light guide plate 11 and controls light emitted through the light-emitting surface 11b. More specifically, the optical sheet 12 includes a diffuser member to diffuse light, a prism member to control light distribution of the diffused light, and other components.

The light source 13 may be, for example, a light emitting diode (LED) having a luminescent surface 13a facing the light-receiving side surface 11a of the light guide plate 11. The light source 13 emits light through the luminescent surface 13a toward the light-receiving side surface 11a of the light guide plate 11 in the Y-axis positive direction. As illustrated in FIG. 1, the light sources 13 are arranged in parallel with one another along the light-receiving side surface 11a of the light guide plate 11, that is, along the X-axis direction, at certain intervals.

The light source 13 has a surface opposite to the luminescent surface 13a fixed to a mounting surface of the substrate 14. That is, the light source 13 is so-called a top-view light source having the luminescent surface 13a arranged substantially parallel with the mounting surface of the substrate 14. Without being limited to the top-view type, the light source 13 may be so-called a side-view light source having the luminescent surface 13a perpendicular to the mounting surface.

The substrate 14 is, for example, flexible printed circuits (FPC) used as a mounting board and has a power supply circuit to supply electric power to the light sources 13. More specifically, the substrate 14 has certain wiring patterns and supplies power, provided from an external power source (not illustrated), to the light sources 13 via the wiring patterns.

The fixing member 15 is, for example, a double-sided tape, and is used to fix the substrate 14 to the frame 10. More specifically, the fixing member 15 bonds a surface, of the substrate 14, opposite to the mounting surface, to the side wall 10a of the frame 10.

The connecting member 16 connects the light guide plate 11 and the light sources 13. More specifically, the connecting member 16 is fixed to the inner surface of the bottom 10b of the frame 10 and connects the light guide plate 11 and the light source 13 in a manner that the light-receiving side surface 11a of the light guide plate 11 is in contact with the luminescent surface 13a of the light source 13.

The light-receiving side surface 11a of the light guide plate 11 and the luminescent surface 13a of the light source 13 are not necessarily in contact with each other, and the light-receiving side surface 11a of the light guide plate 11 and the luminescent surface 13a may be arranged at certain intervals each other.

The light-shielding unit 17 includes a first light-shielding member 17a and a second light-shielding member 17b. The first light-shielding member 17a is, for example, a lightproof single-sided tape that has one end extended so as to partially cover a main surface, of the optical sheet 12, located in the Z-axis positive direction, as a direction in which light is emitted, and has the other end extended along the outer surface of the side wall 10a of the frame 10. The second light-shielding member 17b is, for example, a lightproof double-sided tape that bonds a liquid crystal display laminated on a surface in the Z-axis positive direction and the planar illumination device 1.

A conventional planar illumination device will now be described. A conventional planar illumination device has a plurality of light sources evenly spaced on a light guide plate with a gate portion. In this type of planar illumination device with the evenly spaced light sources, the gate portion formed on an intersecting side surface may attenuate a part of light emitted from the evenly spaced light sources. More specifically, of the light sources, a part of light emitted from the light source closer to the gate portion enters the intersecting side surface of the light guide plate at a comparatively small angle. Without the gate portion, the most part of light would therefore be reflected on the intersecting side surface. On the other hand, with the gate portion, light entering the gate portion easily leaks outside the gate portion, which may reduce the luminance in the periphery (the affected region 50 of FIG. 1) of the gate portion. Such attenuation of light is caused by, for example, various members, provided to the light guide plate, other than the gate portion.

The planar illumination device 1 of the embodiment is therefore configured such that the light sources 13 closer to the gate portion 100 (an example of an attenuation element) that attenuates light are spaced at smaller intervals.

More specifically, as illustrated in FIG. 1, the light sources 13 of the planar illumination device 1 of the embodiment is configured such that an interval D2 between adjacent light sources 13 closer to the gate portion 100 is smaller than an interval D1 between adjacent light sources 13 distanced from the gate portion 100. The amount of light in the periphery of the gate portion 100, that is, in areas closer to the intersecting side surface 11d is therefore increased compared to the light closer to the intersecting side surface 11e. This configuration can compensate for attenuation of light caused by the gate portion 100. In other words, a reduction in the luminance of the affected region 50 is prevented. With the planar illumination device 1 of the embodiment, since a reduction in the luminance in the periphery of the gate portion 100 is prevented, variation in the luminance occurs less.

It is preferable that other intervals between adjacent light sources 13 between the interval D1 and the interval D2 become gradually small toward the gate portion 100. This configuration will be described with reference to FIG. 3.

Figure 3:
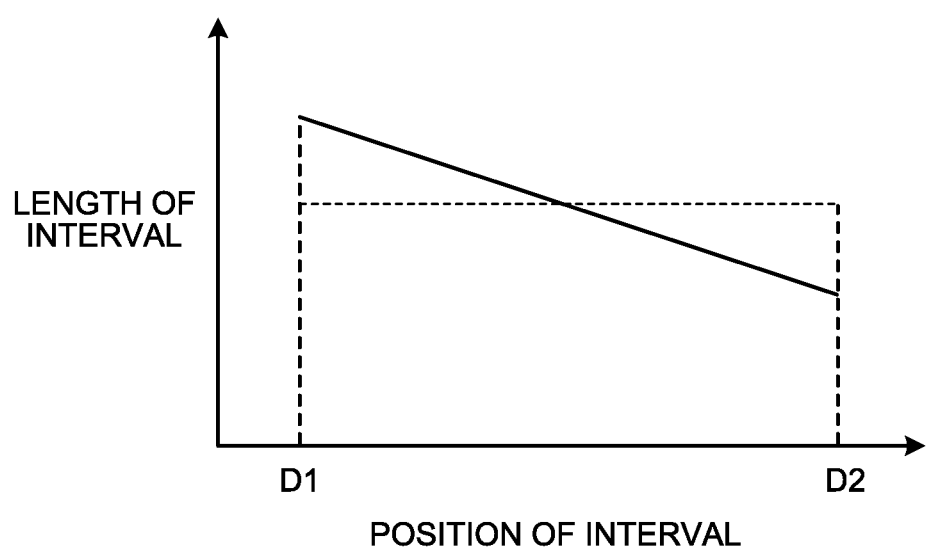
FIG. 3 is a graph that indicates relation between the position of an interval between adjacent light sources and the length of the interval.

FIG. 3 is a graph that indicates relation between the position of an interval between adjacent light sources 13 and the length of the interval. The graph of FIG. 3 indicates the position of an interval between adjacent light sources 13 on the abscissa and the length of the interval on the ordinate. On the abscissa of FIG. 3, "D1" corresponds to the interval D1 at the left end in the X-axis negative direction in FIG. 1, and "D2" corresponds to the interval D2 at the right end in the X-axis positive direction in FIG. 1. FIG. 3 is a graph that indicates each of the intervals between the adjacent light sources 13 on the light guide plate 11 having the gate portion 100 on the intersecting side surface 11d, which is located at the right end of the light guide plate 11 in the X-axis positive direction. For reference, the dashed line of FIG. 3 indicates a conventional structure in which the light sources are evenly spaced.

As illustrated in FIG. 3, the intervals become smaller from the left end (the interval D1) toward the right end (the interval D2). The light sources 13 are arranged at smaller intervals toward the gate portion 100 (the attenuation element). In other words, the light sources 13 are spaced at sequentially varying intervals between adjacent light sources 13 toward the gate portion 100. The sequentially varying intervals allow the luminance of the whole light-emitting surface 11b of the light guide plate 11 to be more consistent.

As illustrated in the graph of FIG. 3, the line of this embodiment indicated by a solid line intersects with the line of a conventional structure indicated by a dashed line. As seen in FIG. 3, from the intersection of the lines, the intervals between the light sources 13 of the embodiment become smaller than those of a conventional structure toward the gate portion 100 and become larger than a conventional structure with distance from the gate portion 100. Since there is no necessity of increasing the number of light sources 13 compared to the conventional structure, this layout is beneficial in reducing variation in the luminance without increasing the manufacturing cost.

In FIG. 3, the intervals vary such that a linear graph is obtained; however, the intervals may vary, for example, stepwise to obtain a stepped graph. FIG. 3 illustrates a graph linearly varying from the left end (the interval D1) toward the right end (the interval D2). Instead of this, the graph may draw a curve or may be bent at any point of an interval between the left end and the right end.

In the above embodiment, the gate portion 100 is formed on the intersecting side surface 11d. The gate portion 100 may be formed on a side surface opposite to the light-receiving side surface 11a of the light guide plate 11. This layout will be described with reference to FIG. 4.

Figure 4:
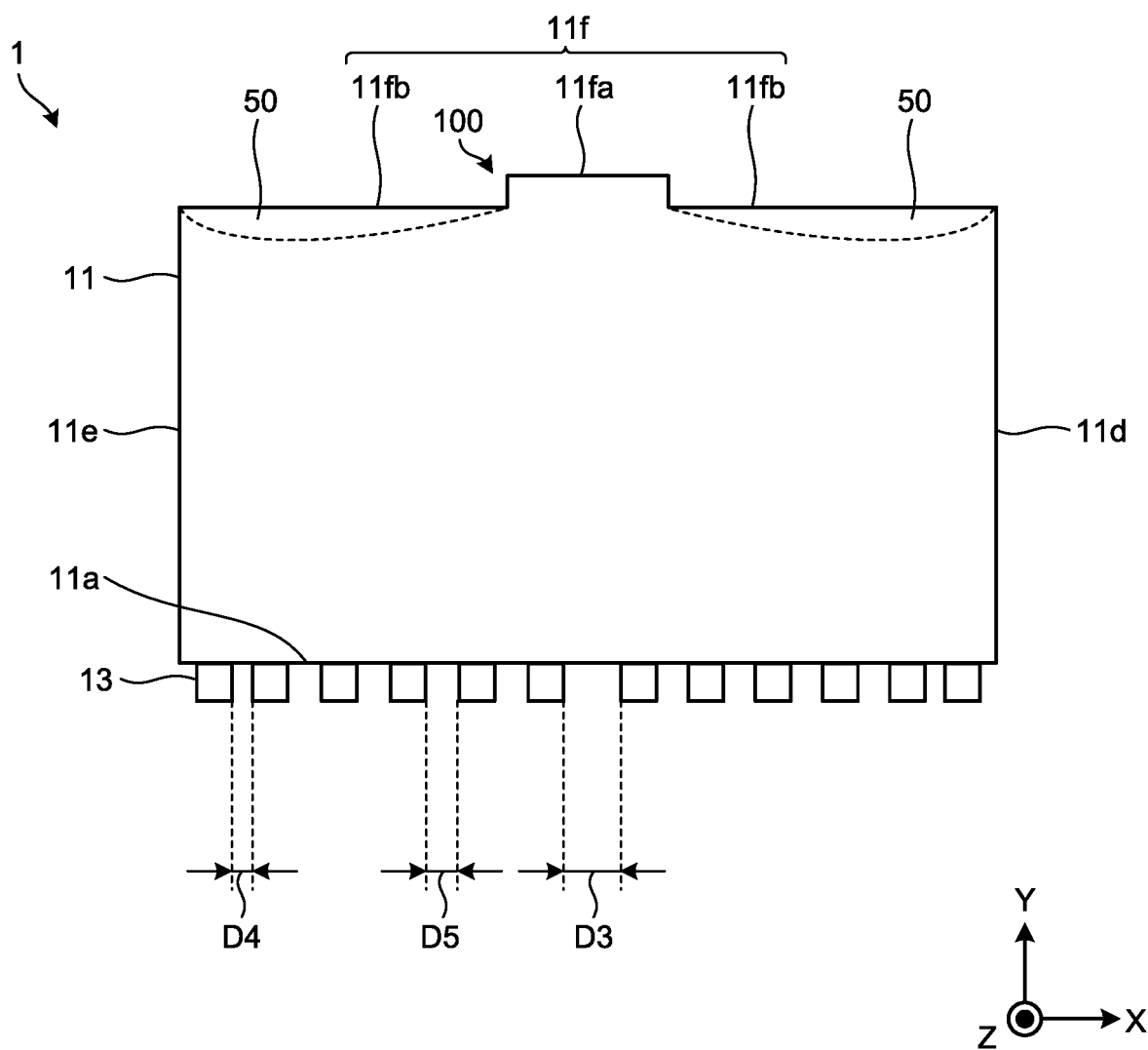
FIG. 4 is a schematic drawing of a planar illumination device of a modification.

FIG. 4 is a schematic drawing of the planar illumination device 1 of a modification. For easy understanding, FIG. 4 exclusively illustrates the light guide plate 11 and the light sources 13. The modification of FIG. 4 is different from the above embodiment in that the gate portion 100 (an example of a projection) projects from a part of an opposite surface 11f (an opposite surface 11fa), a side surface opposite to the light-receiving side surface 11a of the light guide plate 11.

Assuming that the gate portion 100 is not disposed on the opposite surface 11f (if the opposite surface 11f were flat and smooth), light from the light sources 13 would enter the opposite surface 11f at a substantially right angle and therefore easily leak outside the light guide plate 11.

On the contrary, as illustrated in FIG. 4, with the gate portion 100 formed on the opposite surface 11fa (the opposite surface 11fa is rough), light emitted from the light sources 13 and entering the opposite surface 11fa at a substantially right angle is diffusely reflected and thus hardly leaks outside the light guide plate 11 and tends to returns to the light guide plate 11. Light entering opposite surfaces 11fb, surfaces other than the opposite surface 11fa, at a substantially right angle, easily leaks outside the light guide plate 11.

The luminance in areas close to the opposite surface 11fa with the gate portion 100 is therefore higher than the luminance in areas close to the opposite surfaces 11fb. That is, the opposite surface 11fa having the gate portion 100 as a projection, functions as a reflecting element that reflects light, whereas the opposite surfaces 11fb other than the opposite surface 11fa function as attenuation elements that attenuate light. The affected region 50 is therefore formed around each of the opposite surfaces 11fb.

In the modification, the light sources 13 closer to the opposite surface 11fa having the gate portion 100 are spaced at a larger interval D3, and the light sources 13 closer to the opposite surfaces 11fb having no gate portion 100 are spaced at smaller intervals D4 and D5. This layout is beneficial in increasing the luminance around the opposite surfaces 11fb with no gate portion 100 while preventing an excessive rise in the luminance around the opposite surface 11fa with the gate portion 100. As described above, in case the layout having the gate portion 100 on the opposite surface 11fa, less variation in the luminance is prevented in the modification.

Moreover, as illustrated in FIG. 4, the interval D5 between the interval D3 and the interval D4 is set larger than the interval D4 located at the end in the X-axis negative direction. In other words, the intervals between adjacent light sources 13 become gradually large from the interval D4 toward the interval D3.

This configuration can compensate for attenuation of light, which is caused with leakage of a part of light emitted from the light sources 13 corresponding to the interval D4 leaking from the intersecting side surface 11e of the light guide plate 11. Consistency in the luminance is therefore enhanced.

The above embodiment and modification describe configurations in which light is attenuated by the gate portion 100 formed on the light guide plate 11; however, light can be attenuated by various factors other than the gate portion 100. Example configurations in which light is attenuated by factors other than the gate portion 100 will now be described with reference to FIG. 5 to FIG. 10.

FIG. 5 to FIG. 9 are schematic drawings of the planar illumination device 1 of modifications. FIG. 10 is a graph that indicates relation between the position of an interval between adjacent light sources and the length of the interval in a modification. A modification of FIG. 5 will now be described.

Figure 5:
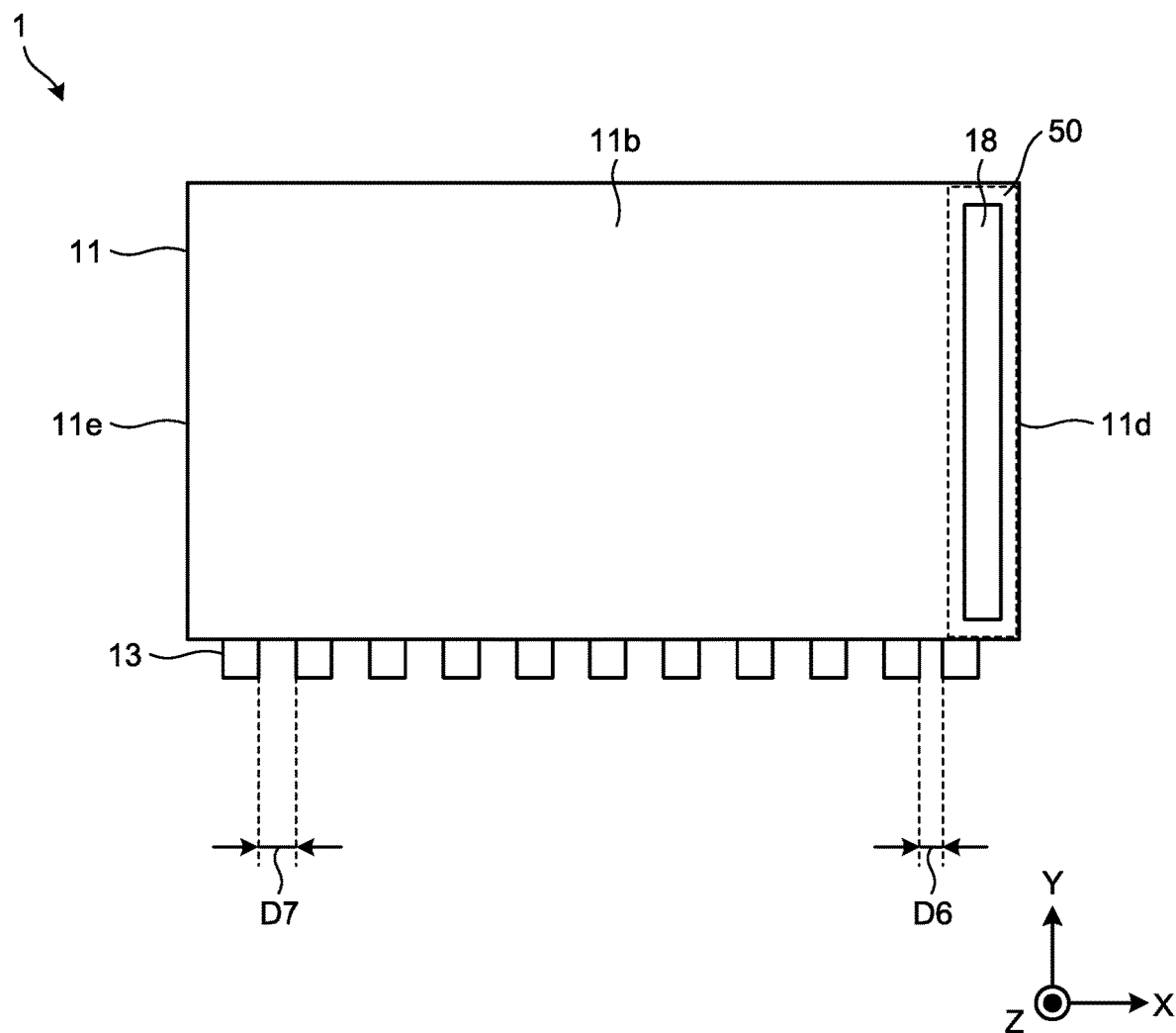
FIG. 5 is a schematic drawing of the planar illumination device of a modification.

The modification of FIG. 5 is different from the above embodiment and modification in that, instead of the gate portion 100, a fixing member 18 is provided on the light-emitting surface 11b of the light guide plate 11. The fixing member 18 is, for example, a double-sided tape to bond the optical sheet 12 and the light guide plate 11.

Specifically, the fixing member 18 is provided on the light-emitting surface 11b, particularly, closer to the intersecting side surface 11d as a short side of the light guide plate 11. More specifically, the fixing member 18 is embedded in a recess created by scraping the light-emitting surface 11b of the light guide plate 11 so as not to project from the light-emitting surface 11b.

This manner allows the fixing member 18 to bond the light guide plate 11 and the optical sheet 12 with the light-emitting surface 11b in contact with the optical sheet 12. The fixing member 18 is not necessarily embedded in the recess created by scraping the light guide plate 11 and, for example, may be placed on the light guide plate 11 in a state not scraped.

As illustrated in FIG. 5, in a case the fixing member 18 is provided to the light guide plate 11, a part of light from the light sources 13 is absorbed by the fixing member 18. In this case, the fixing member 18 serves as an attenuation element that attenuates light, and the affected region 50 is accordingly formed around the fixing member 18. This configuration may problematically reduce the luminance.

In the modification of FIG. 5, an interval D6 between the light sources 13 closer to the fixing member 18 is set smaller than an interval D7 between the light sources 13 distanced from the fixing member 18. This configuration can increase the amount of light in the periphery of the fixing member 18 and thus can compensate for attenuation of light caused by the fixing member 18. The planar illumination device 1 of the modification can reduce variation in the luminance, for use of the fixing member 18 disposed near the intersecting side surface 11d.

In the example of FIG. 5, the fixing member 18 is disposed only at a location close to the intersecting side surface 11d. In another example, the fixing members 18 may be disposed at respective locations close to the intersecting side surface 11d and the intersecting side surface 11e.

Figure 6:
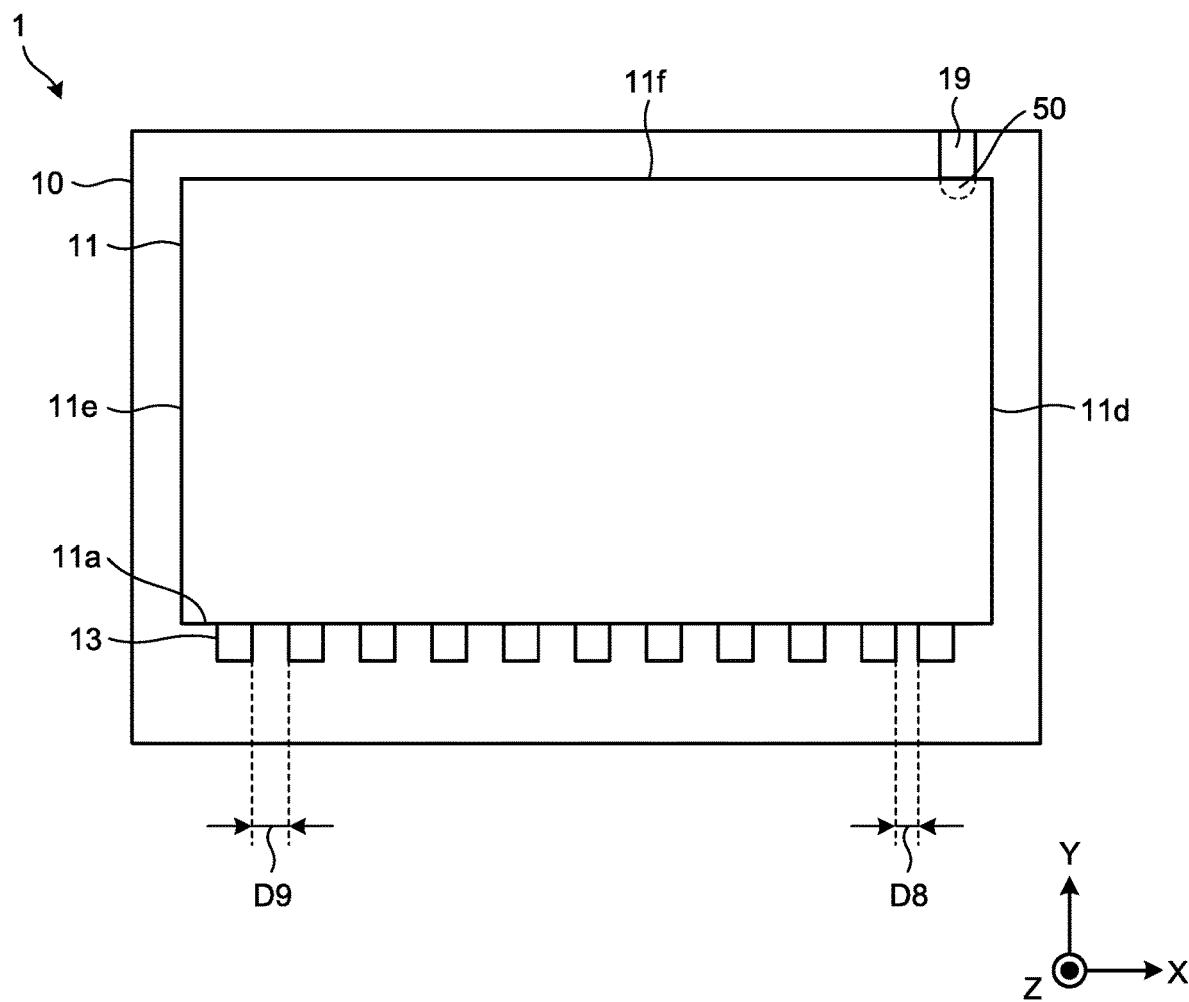
FIG. 6 is a schematic drawing of the planar illumination device of a modification.

FIG. 5 illustrates an example configuration in which the fixing member 18 provided on the light-emitting surface 11b of the light guide plate 11 serves as an attenuation element, but the embodiment is not limited to this example. As another example, as illustrated in FIG. 6, a biasing member 19 provided to a side surface of the light guide plate 11 may serve as an attenuation element. This configuration will be described with reference to FIG. 6.

FIG. 6 illustrates an example configuration in which a biasing member 19 is provided to the opposite surface 11f of the light guide plate 11. The biasing member 19 is formed of, for example, an elastic member such as a rubber. As illustrated in FIG. 6, the biasing member 19 provided to the opposite surface 11f is fixed by being held between the frame 10 and the light guide plate 11. The biasing member 19 fixed in this condition presses the opposite surface 11f, thereby biasing the light guide plate 11 toward the light sources 13.

A part of light from the light sources 13 is therefore absorbed by the biasing member 19. That is, the biasing member 19 serves as an attenuation element, and the affected region 50 is accordingly formed around the biasing member 19. This configuration problematically reduces the luminance.

In a modification of FIG. 6, an interval D8 between the light sources 13 closer to the biasing member 19 is set smaller than an interval D9 between the light sources 13 distanced from the biasing member 19. This layout can increase the amount of light in the periphery of the biasing member 19 and thus can compensate for attenuation of light caused by the biasing member 19. The planar illumination device 1 of the modification can reduce variation in the luminance, for use of the biasing member 19 disposed near the opposite surface 11f.

In the above embodiment and modifications, the light sources 13 are arranged over both end portions of the light-receiving side surface 11a; however, for some reasons, the light sources 13 is not allowed to be arranged at either one of the ends. This configuration will be described with reference to FIG. 7.

Figure 7:
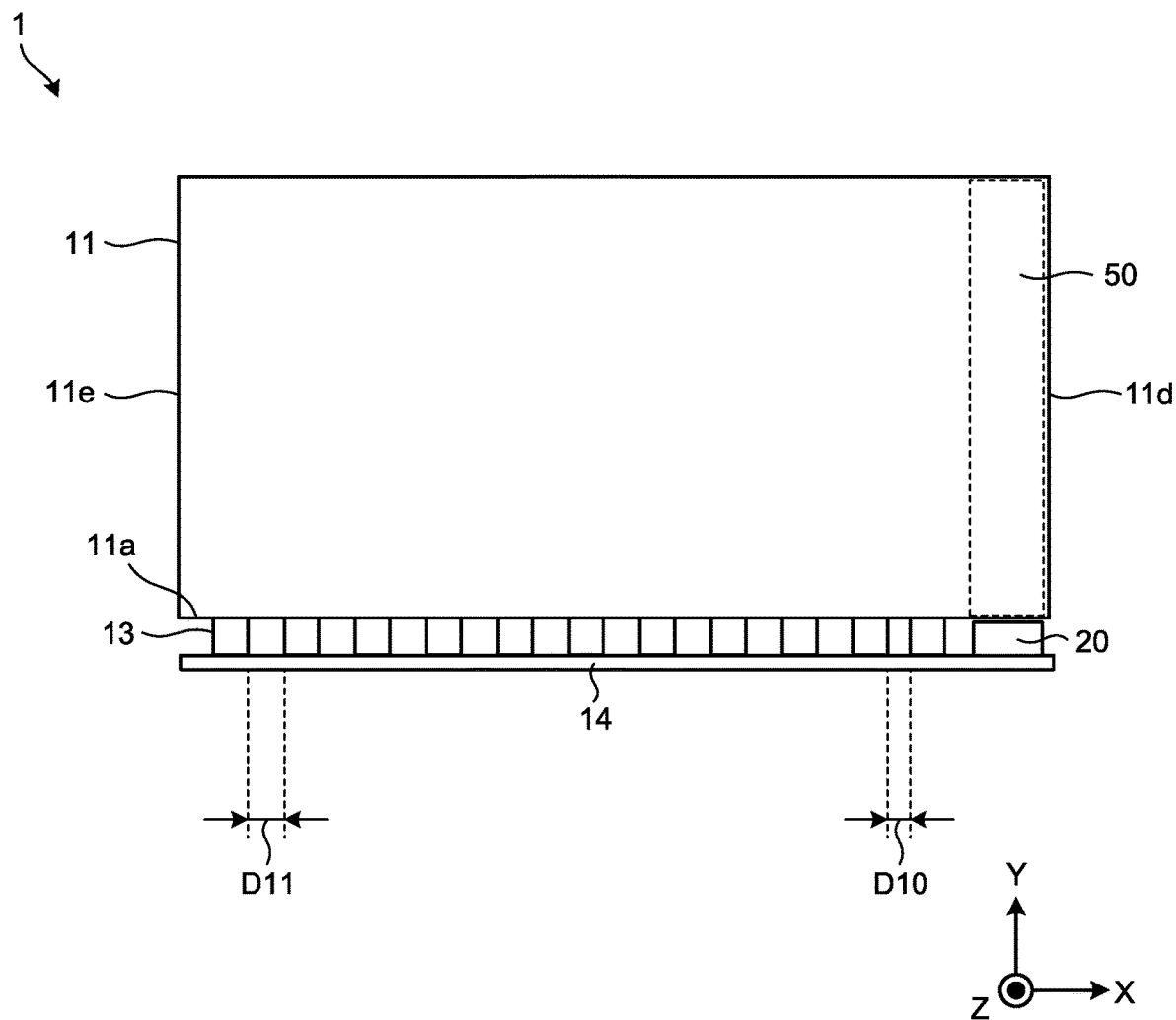
FIG. 7 is a schematic drawing of the planar illumination device of a modification.

For example, FIG. 7 illustrates a thermistor 20 provided to the substrate 14. FIG. 7 illustrates the thermistor 20 disposed at an end in the X-axis direction (for example, in the X-axis positive direction), which is an arraying direction of the light sources 13.

With the thermistor 20 disposed at one of the ends, the light sources 13 are inevitably gathered at the other end (the X-axis negative direction). As a result of this, the light source 13 closest to the thermistor 20 is away from the intersecting side surface 11d of the light guide plate 11, which creates the affected region 50 near the intersecting side surface 11d and reduces the luminance therearound. In other words, the thermistor 20 indirectly serves as an attenuation element that attenuates light.

In a modification of FIG. 7, an interval D10 between the light sources 13 closer to the thermistor 20 is set smaller than an interval D11 between the light sources 13 distanced from the thermistor 20. In other words, if two light sources 13 disposed at both ends in the arraying direction of the light sources 13 are respective different distances away from the corresponding intersecting side surfaces (the intersecting side surface 11e for the left-end light source 13, and the intersecting side surface 11d for the right-end light source 13), the interval D10 of the light source 13 that is a larger distance away from the corresponding intersecting side surface is set smaller than the interval D11 of the light source 13 at the opposite end. This layout can increase the amount of light around the intersecting side surface 11d having the thermistor 20, and thus can compensate for attenuation of light caused by the thermistor 20. The planar illumination device 1 of the modification can reduce variation in the luminance, for the layout in which the light sources 13 are gathered at one of the ends due to the use of the thermistor 20.

In FIG. 7, the thermistor 20 is given as an example, but the embodiment is not limited to this example. Another member that interferes with placement of the light sources 13, for example, a member provided to the substrate 14 and a member provided to a component other than the substrate 14 may be applicable.

Without being limited to a member such as the thermistor 20, the technique is effective for such a condition in which no light sources 13 are allowed to be disposed at an end of the light-receiving side surface 11a because a nearby member would press the light source 13 by, for example, being thermally expanded.

Figure 8:
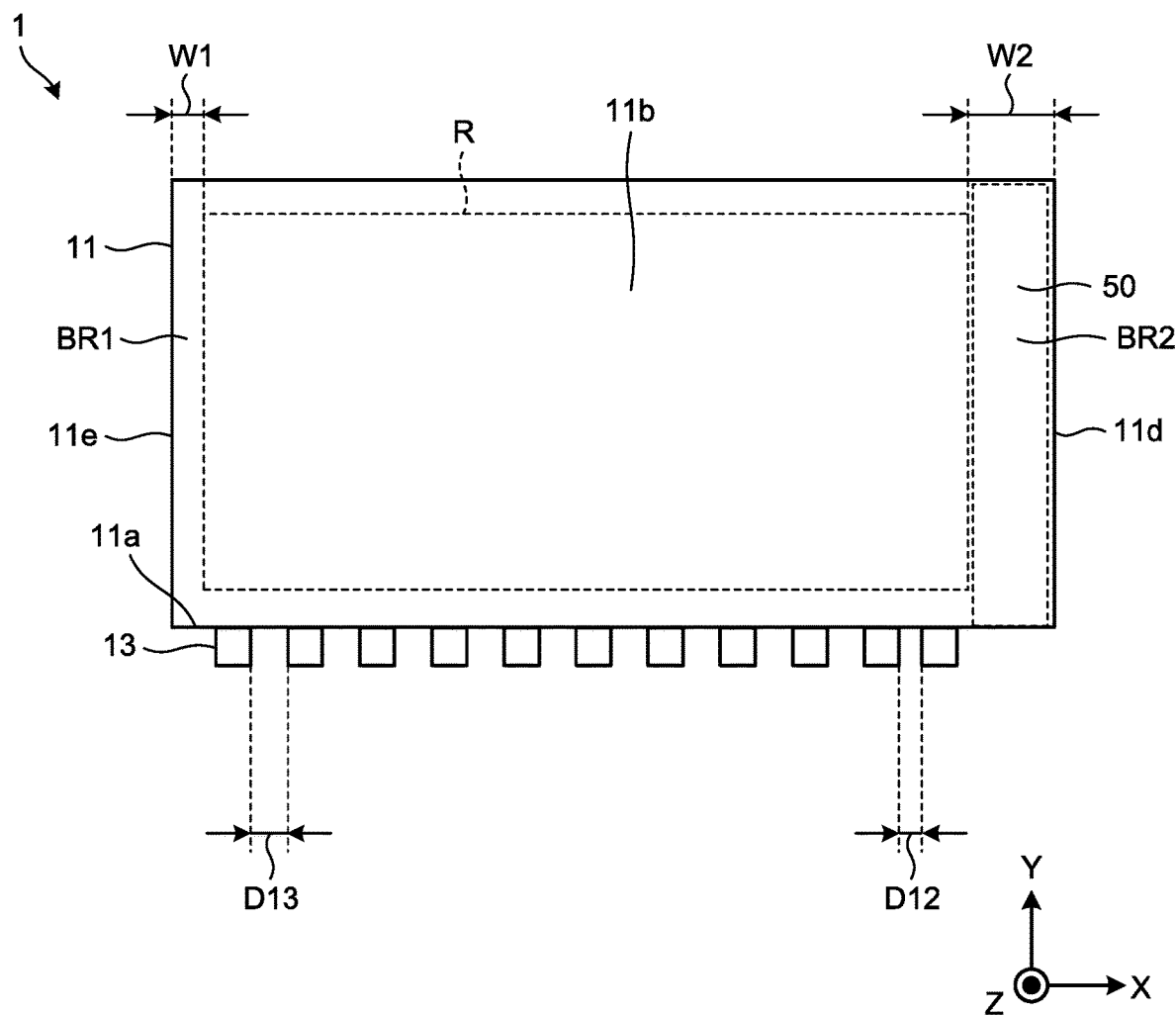
FIG. 8 is a schematic drawing of the planar illumination device of a modification.

FIG. 8 illustrates the light guide plate 11 having an effective luminescent range R asymmetrically defined. The effective luminescent range R is a region in which light emitted through the light-emitting surface 11b is actually used as backlight, in other words, a region, of the light-emitting surface 11b, that light is not shielded.

The effective luminescent range R may be vertically asymmetrically defined on the light guide plate 11. For example, as illustrated in FIG. 8, the effective luminescent range R may be defined closer to an end in the arraying direction of the light sources 13, in this case, closer to the intersecting side surface lie.

In this case, a distance W1 from the intersecting side surface 11e to the effective luminescent range R is shorter than a distance W2 from the intersecting side surface 11d to the effective luminescent range R, which means that a light-shielding region BR2, which is a region closer to the intersecting side surface 11d where light is shielded, is larger than a light-shielding region BR1 closer to the intersecting side surface 11e where light is shielded. Since the light sources 13 are positioned based on the location of the effective luminescent range R, the light sources 13 are gathered at the intersecting side surface 11e on the light guide plate 11.

The light sources 13 are arranged closer to the intersecting side surface 11e and distanced from the intersecting side surface 11d, which forms the affected region 50 near the intersecting side surface 11d and reduces the luminance therearound. The effective luminescent range R asymmetrically defined makes the light-shielding region BR2 larger than the light-shielding region BR1, and the light-shielding region BR2 serves as an attenuation element.

In the modification of FIG. 8, an interval D12 between the light sources 13 closer to the light-shielding region BR2, which is larger than the light-shielding region BR1, is set smaller than an interval D13 between the light sources 13 distanced from the light-shielding region BR2. This layout can increase the amount of light around the light-shielding region BR2 and thus can compensate for attenuation of light caused by the light-shielding region BR2. The planar illumination device 1 of the modification can reduce variation in the luminance, for such a configuration that has the light-shielding region BR2 stretched with the effective luminescent range R asymmetrically defined.

Figure 9:
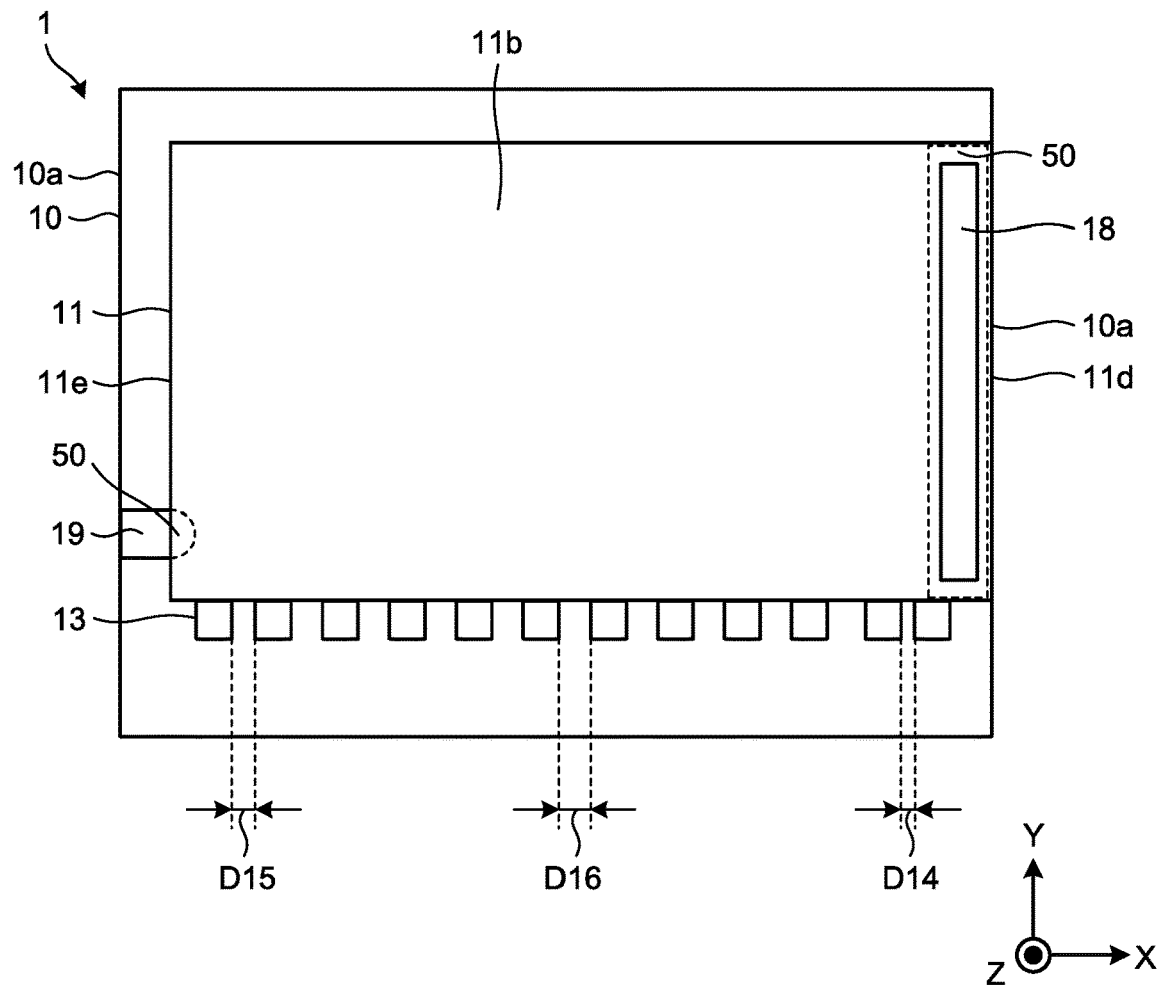
FIG. 9 is a schematic drawing of the planar illumination device of a modification.
Figure 10:
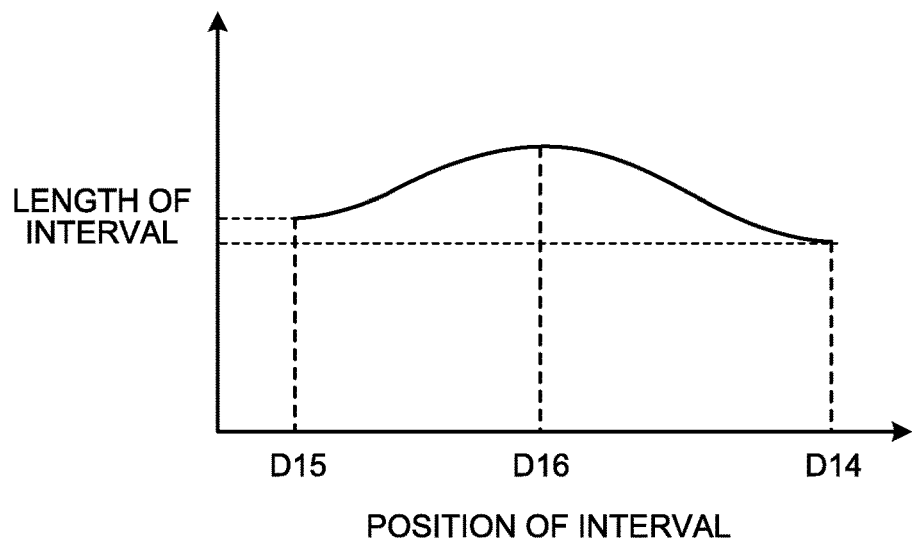
FIG. 10 is a graph that indicates relation between the position of an interval between adjacent light sources and the length of the interval in the modification.

FIG. 9 and FIG. 10 illustrate an example configuration in which two intersecting side surfaces 11d and 11e of the light guide plate 11 have respective attenuation elements. In FIG. 9 and FIG. 10, the fixing member 18 (an example of a second attenuation element) is provided near the intersecting side surface 11d of the light guide plate 11, and the biasing member 19 (an example of a first attenuation element) is provided near the intersecting side surface 11e of the light guide plate 11.

Since the fixing member 18 has been described above, description thereof will be omitted. The biasing member 19 is disposed between the side wall 10a of the frame 10 and the intersecting side surface 11e of the light guide plate 11 and biases the light guide plate 11 in the X-axis positive direction toward the intersecting side surface 11d. The light guide plate 11 is fixed with the intersecting side surface 11d abutting the facing side wall 10a. In this case, the affected regions 50 are formed around the fixing member 18 and formed around the biasing member 19, and the luminance may be problematically reduced.

An interval D14 between the light sources 13 closer to the intersecting side surface 11d with the fixing member 18 is set smaller than an interval D16 between the light sources 13 located around the middle in the arraying direction which is the X-axis direction. This layout can compensate for attenuation of light caused with the fixing member 18 absorbing light and is thus effective in preventing the luminance in the periphery of the intersecting side surface 11d from falling below the luminance in the center portion of the light-emitting surface 11b.

Likewise, an interval D15 between the light sources 13 closer to the intersecting side surface 11e with the biasing member 19 is set smaller than the interval D16. This layout can compensate for the loss of light absorbed by the biasing member 19 and the loss of light leaking to the space between the side wall 10a and the intersecting side surface lie, and is thus effective in preventing the luminance in the periphery of the intersecting side surface 11e from falling below the luminance in the center portion of the light-emitting surface 11b.

Furthermore, as illustrated in FIG. 9 and FIG. 10, the interval D14 closer to the fixing member 18 is set smaller than the interval D15 closer to the biasing member 19. In other words, the size of the interval D14 closer to the fixing member 18 is different from the size of the interval D15 closer to the biasing member 19, and the difference in size corresponds to a difference in the amount of light attenuated by the fixing member 18 and attenuated by the biasing member 19. The example of FIG. 9 indicates that the amount of light attenuated by the fixing member 18 is more than the amount of light attenuated by the biasing member 19. In this manner, in the case of providing attenuation elements to respective ends of the light guide plate 11, variation in the luminance is reduced by changing the size of intervals between adjacent light sources 13 depending on the corresponding attenuation elements.

As the graph of FIG. 10 indicates, the light sources 13 around the middle in the arraying direction have the largest interval (for example, the interval D16). From the light sources 13 around the middle, other light sources 13 are spaced at intervals asymmetrically varying toward the left-end interval D15 (toward the first attenuation element) and toward the right-end interval D14 (toward the second attenuation element). This technique can reduce the variation in the luminance between an end with the fixing member 18 and another end with the biasing member 19.

The modification of FIG. 9 and FIG. 10 is an example, but the modification is not limited to this example. If the amount of light attenuated by the fixing member 18 is less than the amount of light attenuated by the biasing member 19, the interval between adjacent light sources 13 closer to the biasing member 19 is set smaller than the interval between adjacent light sources 13 closer to the fixing member 18.

In FIG. 9 and FIG. 10, the first attenuation element (the biasing member 19) and the second attenuation element (the fixing member 18) have different functions. Without being limited thereto, the first and the second attenuation elements may have the same function while attenuating different amounts of light. For example, if the first and the second attenuation elements have the same function, they may be different from each other in length, weight, location, or the like.

As described above, the planar illumination device 1 according to the embodiment includes the light guide plate 11, the attenuation element, and the light sources 13. The light guide plate 11 has the light-emitting surface 11b, as a main surface through which light is emitted, and the light-receiving side surface 11a, as a side surface intersecting with the light-emitting surface 11b and configured to receive light. The attenuation element attenuates light entering the light guide plate through the light-receiving side surface 11a. The light sources 13 face the light-receiving side surface 11a of the light guide plate 11 and are arranged in parallel with one another at certain intervals. The interval between the light sources closer to the attenuation element is smaller than the interval distanced from the attenuation element. This layout can compensate for attenuation of light caused by the attenuation element and is therefore effective in preventing a reduction in the luminance. Variation in the luminance thus occurs less.

The above embodiment is not intended to limit the present invention. The components described above may be combined as appropriate, and the combination thereof is also included in the present invention. Additional effects and modifications could be easily conceived of by the skilled person. A wider range of aspect of the present invention is not limited to the above embodiment, and various changes can be made.

REFERENCE SIGNS LIST

1 PLANAR ILLUMINATION DEVICE
10 FRAME
11 LIGHT GUIDE PLATE
11a LIGHT-RECEIVING SIDE SURFACE
11b LIGHT-EMITTING SURFACE
11c OPPOSITE SURFACE
11d, 11e INTERSECTING SIDE SURFACE
12 OPTICAL SHEET
13 LIGHT SOURCE
13a LUMINESCENT SURFACE
14 SUBSTRATE
15, 18 FIXING MEMBER
16 CONNECTING MEMBER
17 LIGHT-SHIELDING UNIT
19 BIASING MEMBER
100 GATE PORTION

The invention claimed is:

1. A planar illumination device comprising:
a light guide plate having a light-emitting surface that is a main surface through which light is emitted and a light incident side surface that is a side surface intersecting with the light-emitting surface and receives the light;
an attenuation element that attenuates the light entering to the light guide plate through the light incident side surface of the light guide plate; and
a plurality of light sources that face the light incident side surface of the light guide plate and are arranged in parallel with one another at certain intervals, one of the intervals between adjacent light sources closer to the attenuation element being smaller than another of the intervals between adjacent light sources distanced from the attenuation element, wherein
the light sources are disposed at only one side facing the light incident side surface of the light guide plate,
the attenuation element is formed on an outer surface of the light guide plate, and
a reflectivity of light incident to the attenuation element is lower than a reflectivity of light incident to another part adjacent to the attenuation element.

2. The planar illumination device according to claim 1, wherein
the light guide plate has two intersecting side surfaces intersecting with each of the light-emitting surface and the light incident side surface of the light guide plate; and
the attenuation element is disposed on at least one of the two intersecting side surfaces or near at least one of the intersecting side surfaces of the light guide plate.

3. The planar illumination device according to claim 2, wherein the attenuation element is a projection that projects from at least one of the two intersecting side surfaces toward outside the light guide plate.

4. The planar illumination device according to claim 3, wherein the attenuation element is formed, on the light-emitting surface, closer to at least one of the two intersecting side surfaces.

5. The planar illumination device according to claim 2, further comprising:
a projection that projects from one part of an opposite surface toward outside the light guide plate, the opposite surface being a side surface opposite to the light incident side surface of the light guide plate, wherein
the attenuation element is another part of the opposite surface other than the one part of the opposite surface having the projection.

6. The planar illumination device according to claim 5, wherein the attenuation element is formed, on the light-emitting surface, closer to at least one of the two intersecting side surfaces.

7. The planar illumination device according to claim 2, wherein the attenuation element is formed, on the light-emitting surface, closer to at least one of the two intersecting side surfaces.

8. The planar illumination device according to claim 2, wherein
the attenuation element includes a first attenuation element that is formed on one of the two intersecting side surfaces or near the one of the intersecting side surfaces and a second attenuation element that is formed on the other of the two intersecting side surfaces or near the other of the intersecting side surfaces and attenuates a certain amount of light different from an amount of light of the first attenuation element, and
the light sources have one of the intervals between adjacent light sources closer to the first attenuation element being different from another of the intervals between adjacent light sources closer to the second attenuation element.

9. The planar illumination device according to claim 8, wherein
the light sources have the largest one of the intervals at a substantially middle in an arraying direction of the light sources, and
with respect to the substantially middle, the light sources have the intervals asymmetrically varying toward the first attenuation element and toward the second attenuation element.

10. The planar illumination device according to claim 2, wherein,
a first pair of light sources and a second pair of light sources are disposed adjacent respective intersecting side surfaces in an arraying direction of the light sources, and the first pair of light sources is disposed away from its respective intersecting side surface at a larger distance than a spaced distance between the second pair of light sources and its respective intersecting side surface, and
an interval between each light source of the first pair of light sources is smaller than an interval between each light source of the second pair of light sources.

11. The planar illumination device according to claim 1, wherein the light sources have the intervals that are smaller as the light sources are closer to the attenuation element.

12. The planar illumination device according to claim 1, wherein the attenuation element is an elastic member that is provided on an opposite surface that is a side surface opposite to the light incident side surface of the light guide plate, and that biases the light guide plate toward the light sources.

13. The planar illumination device according to claim 1, wherein the attenuation element is an elastic member that is provided to one of two intersecting side surfaces intersecting with each of the light-emitting surface and the light incident side surface of the light guide plate, and that biases the light guide plate toward the other of the two intersecting side surfaces.

14. The planar illumination device according to claim 1, wherein any surface of the light guide plate other than the light incident side surface does not face with the light sources.

15. The planar illumination device according to claim 1, wherein the attenuation element is not disposed on the light incident side surface of the light guide plate.

* * * * *